United States Patent [19]

Meynier

[11] 4,453,380

[45] Jun. 12, 1984

[54] METHOD AND APPARATUS FOR SETTING THE IDLE STROKE OF A MASTER-CYLINDER/SERVO ASSEMBLY, AND BRAKE CONTROL UNIT ADJUSTED BY IMPLEMENTING THIS METHOD

[75] Inventor: Guy Meynier, Bondy, France

[73] Assignee: Societe Anonyme DBA, Paris, France

[21] Appl. No.: 407,389

[22] Filed: Aug. 12, 1982

[30] Foreign Application Priority Data

Sep. 22, 1981 [FR] France .................. 81 17839

[51] Int. Cl.$^3$ .............................................. B60T 17/22
[52] U.S. Cl. ...................................... 60/534; 60/547.1; 60/584; 60/588; 303/56; 92/13.2; 92/13.41; 92/13.6
[58] Field of Search ....................... 60/547.1, 534, 584, 60/588; 92/13.2, 13.6, 13.41; 303/56

[56] References Cited

U.S. PATENT DOCUMENTS

| | | | |
|---|---|---|---|
| 3,364,818 | 1/1968 | Hager et al. ...................... | 91/24 |
| 3,969,898 | 7/1976 | Fulmer et al. ........................ | 60/534 |
| 4,056,043 | 11/1977 | Sriramamurty et al. ............ | 92/13.2 |
| 4,227,371 | 10/1980 | Takeuchi ............................ | 60/547.1 |
| 4,270,355 | 6/1981 | Green ................................... | 92/129 |
| 4,307,570 | 12/1981 | Yardley .............................. | 60/547.1 |

FOREIGN PATENT DOCUMENTS 1630150 7/1971 Fed. Rep. of Germany .
2208762 9/1972 Fed. Rep. of Germany .
2326415 12/1973 Fed. Rep. of Germany .

Primary Examiner—Robert E. Garrett
Assistant Examiner—Scott L. Moritz
Attorney, Agent, or Firm—Larry J. Palguta; Ken C. Decker

[57] ABSTRACT

According to the invention, the communication between the supply orifice (40,41) and the corresponding pressure chambers (38,39) of the master-cylinder (11) is tested while the stop (25) defining the rest position of the piston (15) of the servo is being displaced, and this stop (25) is finally immobilized by crimping when the correct position of the stop has thus been found.

8 Claims, 4 Drawing Figures

FIG_1

METHOD AND APPARATUS FOR SETTING THE IDLE STROKE OF A MASTER-CYLINDER/SERVO ASSEMBLY, AND BRAKE CONTROL UNIT ADJUSTED BY IMPLEMENTING THIS METHOD

The subject of the invention is essentially a method of setting or adjusting the idle stroke of the piston or pistons of a master-cylinder mounted at the end of a vacuum servo.

The invention also concerns a setting apparatus for implementing this method as well as any brake control unit constituted by a master-cylinder associated with such a vacuum servo and whose idle stroke is determined by implementing the method mentioned hereinbefore.

The idle stroke of a braking master-cylinder is defined as being the distance between the edge of the outer rim of the sealing ring of the piston and the furthest edge (in the rest position of the piston) of the supply and compensation orifice connected to the brake fluid reservoir. In practice, in a braking action, as long as this orifice is not sealed by the sealing ring, there is a communication between said reservoir and the pressure chamber of the master-cylinder and no rise in pressure can occur in the latter. This orifice, or the two orifices in the case of a double master-cylinder, must be uncovered in the rest position of the piston or pistons. As a result, the idle stroke is determined by the manufacturing tolerances of a certain number of parts of the master-cylinder and also by the manufacturing tolerances of a certain number of parts of the assistance servo when, as is conventionally the case, the master-cylinder is mounted at the end of such a servo. As a result, the real value of the idle stroke of the master-cylinder is somewhat uncertain when a master-cylinder and a servo are assembled. It is therefore necessary for there to be a certain safety margin in production in order to be sure that the assembling of the master-cylinder and the servo does not result in sealing of at least one of the supply orifices in the rest position. In other words, certain brake control units are given an unnecessarily long idle stroke.

The invention allows this idle stroke to be set at a precise value and therefore reduced to the necessary minimum.

There is another object of the invention to provide for a method of setting the idle stroke of a compact master-cylinder/vacuum servo-assembly without necessitating the use of an intermediate thrust rod inside the assembly.

To achieve this, the invention principally concerns a method of setting the idle stroke of the piston or pistons of a master-cylinder mounted at one end of a casing of an assistance servo comprising an assistance piston coupled to an aforesaid piston of the master-cylinder, said piston(s) of the master-cylinder delimitating a pressure chamber in a master-cylinder housing into which opens at least one supply orifice, said assistance piston being normally urged in operative conditions by a spring against a stop arranged at the rear part of the casing of the servo, which method comprises the following steps:

assembling at least most of the constitutive active elements of the master-cylinder and the servo while temporarily leaving said stop displaceable axially with respect to said case;

displacing said stop while testing fluid communication between said supply orifice of said master-cylinder and the corresponding pressure chamber;

finding a reference position for said stop, wherein such a communication is initiated;

displacing said stop by a predetermined amount from this reference position, as a function of the idle stroke required; and finally fixing said stop to said case.

Communication between the supply orifice of the master-cylinder and the corresponding pressure chamber is preferably tested by means of a fluid source connectable to said supply orifice, and the test can consist for example in determining if fluid circulation is established between said supply orifice and the corresponding pressure chamber of the master-cylinder.

The invention also concerns an apparatus for setting the idle stroke of the piston of a master-cylinder mounted at the end of an assistance servo, for implementing the above mentioned method, which includes at least one fluid circulation circuit including a pressurized fluid source (for example, compressed air) or a vacuum source, a fluid pressure detector and means for connection to at least one orifice of the master-cylinder, as well as means for crimping a stop defining the rest position of the assistance piston of said servo, these crimping means being arranged near one axial tubular end portion of the casing of the servo (at the actuating member end thereof) when the assembly of said master-cylinder and said servo is in setting position on said apparatus.

Lastly, the invention also concerns a brake control unit for a motor vehicle, of the type comprising a preassembled master-cylinder and assistance servo assembly, in which the idle stroke of the master-cylinder is adjusted by implementing the above method, wherein a stop defining the rest position of the assistance piston is fixed, e.g. crimped, near one axial tubular end portion of the casing of said servo at the actuating member end thereof.

The invention will be better understood and other details and advantages thereof will be more evident in the light of the following description given solely by way of example and with reference to the attached drawings in which.

Figure 1:
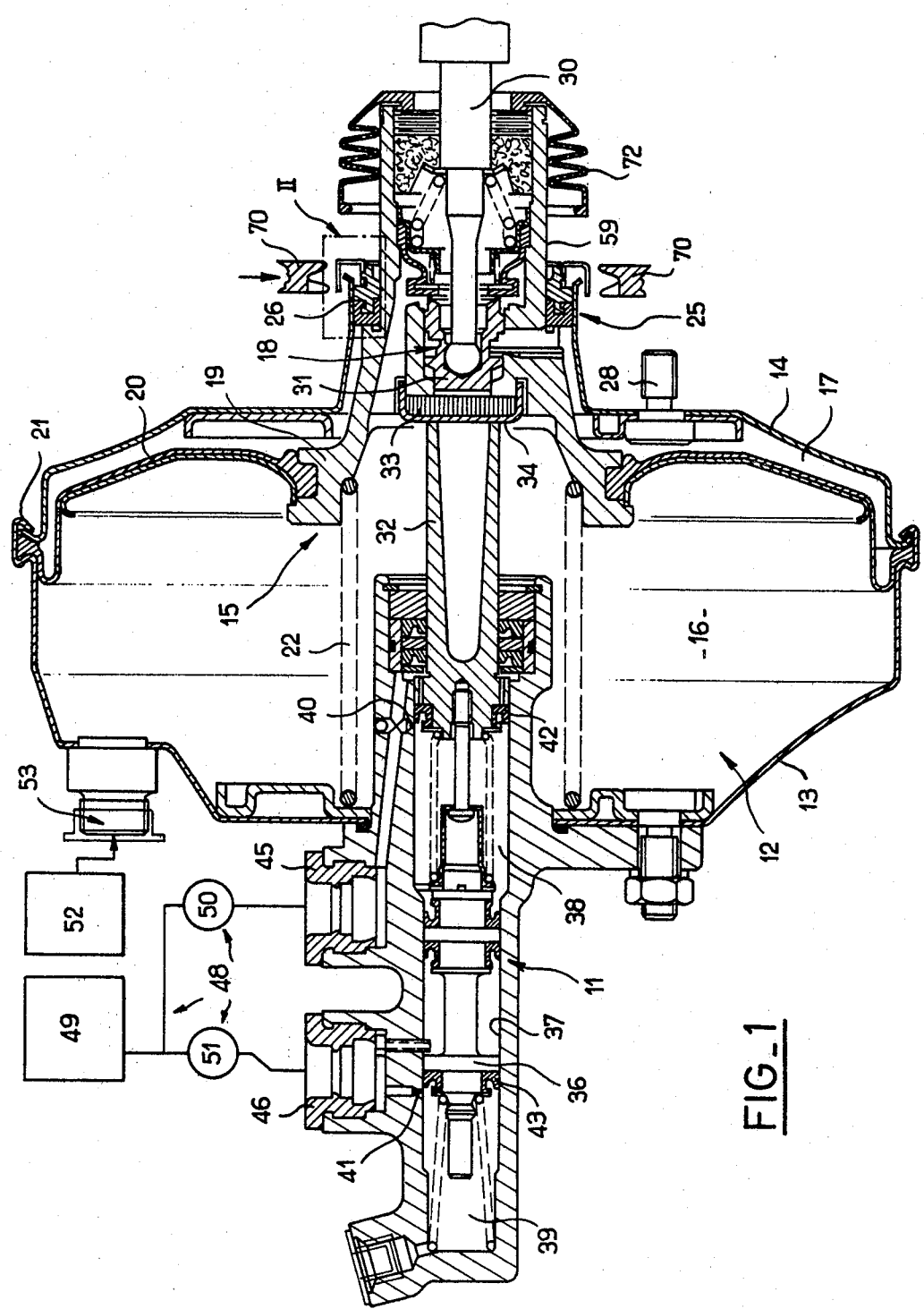
FIG. 1 shows a brake control assembly at the moment the method according to the invention is implemented.

A brake control assembly to which the invention applies is composed of a master-cylinder 11 and an assistance servo 12 of the vacuum type. The servo 12 is essentially conventional and is composed of a casing constituted by an assembly of two shells 13 and 14 housing a movable assistance piston 15, which divides said casing into two chambers 16 and 17 capable of being isolated from each other by a three-way valve mechanism 18 housed in a central body 19 of the assistance piston. In addition to this central body 19, the assistance piston 15 includes a flexible membrane 20 provided with an outer peripheral bead 21 gripped between the assembling edges of the shell 13 and 14. A spring 22 mounted inside the chamber 16 urges the assistance piston 15 towards its rest position, i.e. in abutment against a stop assembly 25 whose characteristic details are dictated by the nature of the setting method according to the invention. This stop 25 will be described in detail hereinafter but it will be noted that, in the mounting condition illustrated in FIG. 1, it is still displaceable axially with respect to the casing and more particularly with respect to an axial tubular end portion 26 of the shell 14 of said casing, i.e. the rear shell, which is intended to be mounted onto the protective wall of a vehicle, by means of screws 28. The actuating member 30 of the brake control unit, intended to be connected to the brake pedal of the vehicle, is connected via a swivel joint to the movable valving member 31 of the valve mechanism 18 which is displaceable coaxially in the direction toward the primary piston 32 of the master-cylinder 11, with a resilient reaction disc 33 conventionally interposed therebetween. However, the piston 32 bears directly against a metal cap 34 keeping the reaction disc 33 inside the central body 19. In other words, the thrust rod of adjustable length which is usually interposed between the disc 33 and the piston 32 is here omitted since the compensation for tolerances which this rod usually permits is now unnecessary because of the setting method according to the invention.

The master-cylinder 11 is mounted at the end of the shell 13 while being partially nested therein. An entirely conventional double master-cylinder is involved, which typically includes two pistons, respectively a primary piston 32 and a secondary piston 36 defining inside the bore 37 of the master-cylinder housing two pressure chambers, respectively a primary chamber 38 and a secondary chamber 39. A supply and compensation orifice 40 opens into the primary chamber 38 and a similar supply and compensation orifice 41 opens into the secondary pressure chamber 39. The primary piston 32 bears a sealing ring 42 at its front end and the piston 36 bears similarly a sealing ring 43 at its front end. The orifices 40 and 41 are designed to be connected to a reservoir of brake fluid (not shown) via respective coupling fittings 45 and 46. In implementing of the method of the invention, the fittings 45 and 46 are temporarily connected to a fluid circulation circuit 48. In the example represented, this circuit includes a vacuum source 49 connected to both fittings 45 and 46 via respective suitable respective pneumatic detectors 50, 51. Another vacuum source 52 is connected to the fitting 53 of the vacuum chamber 16 of the servo to simulate normal operating conditions of the latter.

As mentioned previously, the idle stroke of the master-cylinder is defined as being the distance between the edge of the outer rim of the sealing ring 42 or 43 and the furthest edge of the corresponding supply orifice orifice 40 or 41 remote from this rim-edge in the rest position of the corresponding piston 32 or 36. In the case of a double piston master-cylinder as illustrated, the shortest of the two distances concerned is that required to be made equal to the predetermined idle stroke of reduced value, to ensure that both orifices 40 and 41 are actually uncovered outside a braking phase.

Figure 2:
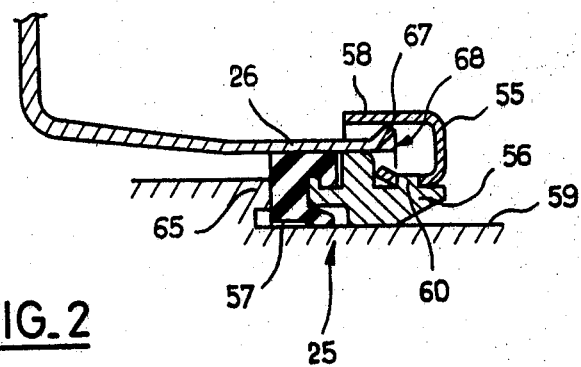
FIG. 2 is a detailed view of Box II of FIG. 1, before final immobilization of the stop.
Figure 3:
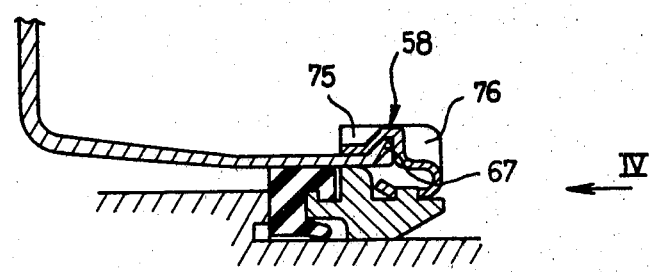
FIG. 3 is a similar view to that of FIG. 2 after final immobilization of the stop.
Figure 4:
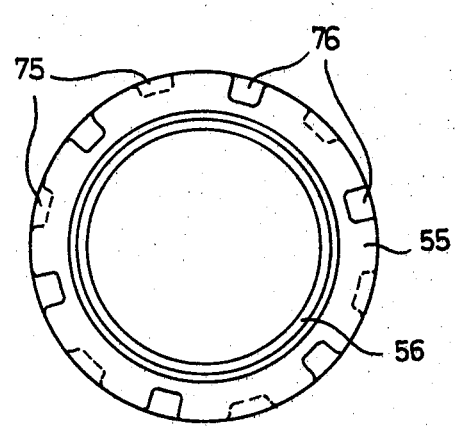
FIG. 4 is a view along the arrow IV of FIG. 3.

The features of the stop 25 are clearly shown in FIGS. 2 and 3. This stop is composed of three parts, namely a fixing ring 55, a guiding ring 56 and an annular seal 57; the fixing ring 55 is the part intended to be secured by crimping to the axial tubular end 26 of the shell 14. This ring 55, made of metal, projects beyond the outer end portion 26 and includes an outer portion 58 bent back to overlap said end portion. Initially, i.e. before implementing the method of the invention, the bent portion 58 is substantially cylindrical. The guiding ring 56, made of a rigid material, is inserted between the inner wall of the end portion 26 and a cylindrical outer surface 59 of the central body 19. The fixing ring 55 is supported onto this guiding ring by means of studs 60 engaged in corresponding holes formed in the inner portion of ring 55. The seal 57 is housed inside the end portion 26, thereby ensuring sealing between this and the cylinder outer surface 59 of the central body 19, the seal being affixed to the guiding ring 56. The three elements 55, 56 and 57 of the stop assembly 25 are thus connected together and the assembly is able to be displaced axially with respect to the end portion 26, as long as the fixing ring 55 has not been deformed by crimping. The central body 19 of the assistance piston 15 includes an annular shoulder 65 adjacent the cylindrical surface 59, said shoulder coming into abutment against the seal 57 of the stop assembly 25 in the rest position of the system. To carry out the crimping mentioned hereinbefore more adequately, the free outer edge 67 of the end portion 26 is bent slightly radially outwards and includes pressed notches 68 regularly distributed on its periphery. When the brake control unit constituted by the preassembled master-cylinder and vacuum servo is installed in position on the apparatus for setting the idle stroke according to the invention, stamping tools 70 are arranged circumferentially at regular intervals facing the edge 67. They include offset stamp members for deforming the cylindrical part 58 on either side of this edge 67. At the beginning of the setting method, the fluid circulation circuit 48 is connected to the fittings 45 and 46, the servo (chamber 16) is put under vacuum by coupling to the vacuum source 52 and the preassembled control unit is positioned as mentioned hereinbefore, so that the stamping tools 70 are correctly positioned with respect to the end portion 26, the stop assembly 25 being in the condition as illustrated in FIG. 2 and the protective bellows 72 of the rear part of the central body 19 being temporarily folded up apart to be spaced from the stamping region. The stop assembly 25 is then displaced as a whole leftwards, as viewed in FIG. 1, so that the two orifices 40 and 41 are sealed by the respective sealing rings 42 and 43 of the pistons. The stop assembly 25 is then displaced progressively rightwards, as viewed in FIG. 1, while fluid communication between the orifice 41 and the chamber 39 on the one hand, and the orifice 40 and the chamber 38 on the other is tested by means of the pneumatic detectors 50 and 51. During this displacement, a first fluid communication is achieved; for reasons of construction, communication between the orifice 41 and the chamber 39 will usually be observed first. Still continuing the rightwards displacement of the stop 25, a reference position for said stop is found, wherein fluid communication between the orifice 40 and the chamber 38 is initiated, i.e. the position corresponding to the initiation of the communication between a supply orifice and the corresponding pressure chamber occurring second, after the orifice 41 is set in communication with the chamber 39. When this reference position has been found, the stop 25 is displaced in the same direction (rightwards) by a predetermined amount from said reference position and the stamping tools 70 are actuated. The latter are preferably shaped so as to stamp into the outer bent back portion 58 of the fixing ring 55 two series of notches 75 and 76, circumferentially alternate and respectively located either side of the edge 67 of the end portion 26, as illustrated in FIGS. 3 and 4.

Many modifications can of course be made to the method just described, without departing from the scope of the invention as claimed. In particular, the method of testing the communication between a supply orifice and the corresponding pressure chamber can be modified. For example, a fluid circulation circuit can be used including a source of compressed air instead of the vacuum source 49. This source of compressed air will then preferably be connected to the outlets (connection to brake circuit) of the pressure chambers of the master-cylinder so that the sealing rings 42, 43 stay applied to the inner wall of the bore of the master-cylinder during implementation of the method. The invention therefore covers all the technical equivalents or means used if these are within the scope of the following claims.

I claim:

1. Method of setting the idle stroke of the piston or pistons of a master-cylinder mounted at one end of a casing of an assistance servo including an assistance piston coupled to an afore-said piston of said master-cylinder, said piston(s) of said master-cylinder delimitating within said master-cylinder at least one pressure-chamber into which opens at least one supply orifice, said assistance piston (15) being normally urged in operative condition against a stop (25) arranged at the opposite end of said casing of the servo (12), characterized in that it comprises the following steps:

assembling at least most of the constitutive active elements of the master-cylinder (11) and the servo (12), while leaving said stop (25) temporarily displaceable axially with respect to said casing;

displacing said stop (25) while testing fluid communication between said supply orifice (40,41) of said master-cylinder and said corresponding pressure chamber (38,39);

finding a reference position for said stop (25), wherein such a communication is initiated;

displacing said stop by a predetermined amount from this reference position, as a function of the idle stroke required; and finally fixing said stop (25) to said casing.

2. A method according to claim 1, characterized in that testing said fluid communication is achieved by means of a fluid circulation circuit (48) connectable to said supply orifice (40 or 41).

3. Method according to claim 1 or 2, for a double master-cylinder including two independent pressure chambers and two supply orifices, characterized in that it comprises the steps of testing said fluid communication between each said supply orifice (40,41) and the corresponding pressure chamber (38,39) by displacing said stop (25) from a starting position wherein both fluid communications are cut off, and in taking into account as said reference position the position of said stop wherein a second fluid communication between one of said supply orifices and the corresponding pressure chamber occurs after a first fluid communication has been established between the other supply orifice and the other pressure chamber.

4. Method according to claim 1, characterized in that said stop (25) is fixed by crimping to an axial tubular end portion (26) of said casing.

5. Method according to claim 1, characterized in that said servo is put under vacuum before said reference position is found.

6. The method of claim 4, wherein said stop (25) includes a metal fixing ring (55) projecting beyond said tubular end portion (26) and comprising an outer portion (58) bent back to overlap said tubular end portion (26), and wherein said fixing ring (55) is crimped circumferentially to said tubular end portion (26) by radial stamping.

7. The method of claim 6, wherein said stop (25) further includes a rigid guiding ring (56) inserted between said tubular end portion (26) of said casing and a cylindrical surface (59) of a central body (19) integral with said assistance piston (15), said guiding ring (56) supporting said fixing ring (55).

8. The method of claim 7, wherein said stop (25) further includes an annular seal (57) insuring sliding sealing between said tubular end portion (26) of said casing and said cylindrical surface (59) of said central body (19) and affixed to said guiding ring (56), said seal (57) cooperating in abutment engagement with an annular shoulder (65) of said central body (19) in a rest position of the servo.

* * * * *